(12) United States Patent
Gautier et al.

(10) Patent No.: US 10,510,453 B2
(45) Date of Patent: Dec. 17, 2019

(54) ELECTRICITY GENERATION FACILITY COMPRISING A DEVICE FOR PRODUCING STEAM OF REDUCED HEIGHT, APPLICATION TO PWR AND BWR REACTORS

(71) Applicant: COMMISSARIAT A L'ENERGIE ATOMIQUE ET AUX ENERGIES ALTERNATIVES, Paris (FR)

(72) Inventors: Guy-Marie Gautier, Pertuis (FR); Pierre Allegre, Aix-en-Provence (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 735 days.

(21) Appl. No.: 14/768,124

(22) PCT Filed: Feb. 14, 2014

(86) PCT No.: PCT/IB2014/059000
§ 371 (c)(1),
(2) Date: Aug. 14, 2015

(87) PCT Pub. No.: WO2014/125442
PCT Pub. Date: Aug. 21, 2014

(65) Prior Publication Data
US 2016/0005498 A1    Jan. 7, 2016

(30) Foreign Application Priority Data

Feb. 15, 2013    (FR) ..................................... 13 51329

(51) Int. Cl.
*G21C 3/56* (2006.01)
*G21C 15/253* (2006.01)
(Continued)

(52) U.S. Cl.
CPC ............ *G21C 15/253* (2013.01); *F01L 15/10* (2013.01); *F22B 1/025* (2013.01); *F22B 37/268* (2013.01); *G21C 1/322* (2013.01); *Y02E 30/40* (2013.01)

(58) Field of Classification Search
CPC . G21C 1/00; G21C 1/32; G21C 1/322; G21C 1/324; G21C 1/326; G21C 1/328; G21D 1/02
See application file for complete search history.

(56) References Cited

U.S. PATENT DOCUMENTS

| 3,213,833 A * | 10/1965 | Cunningham .......... F22B 1/023 122/32 |
| 5,564,370 A | 10/1996 | Giraud et al. |
| 2011/0051880 A1 | 3/2011 | Al-Mayahi et al. |

FOREIGN PATENT DOCUMENTS

| EP | 1464058 | 1/2010 |
| FR | 2471550 | 6/1981 |

(Continued)

*Primary Examiner* — Marshall P O'Connor
(74) *Attorney, Agent, or Firm* — Norton Rose Fulbright US LLP

(57) ABSTRACT

The invention relates to an electrical energy generation facility comprising: —a steam generation device (1) that is suitable for producing saturated steam (VI) from a heat source and is arranged in a chamber (10); —a set of one or more separators (13) that is/are connected downstream to the steam generation device (1) and is/are suitable for removing most of the water from the steam (VI) generated by the device (1), said set being arranged in the chamber (10); —a set of one or more dryers (14) which is connected upstream to the set of separators (13) and is suitable for collecting the water droplets suspended in the steam (V2) that is discharged from the set of separators so as to generate dry steam (V3); —a steam turbine (2) comprising at least one body (20) for expanding dry steam (V3), the steam turbine (Continued)

being suitable for producing electricity from the dry steam (V3); —a set of exchangers (23, 7) suitable for operating as steam superheaters or for reheating supply water; the set of one or more dryers (14) is arranged outside the chamber (10) of the steam generation device (1), the inlet (14a) of the set of dryers is connected upstream to the set of separators (13), a first outlet (14b) is connected downstream to the inlet of the body (20) of the turbine, and a second outlet (14c) is connected downstream, as a heat source, to the set of exchangers (23, 7).

16 Claims, 3 Drawing Sheets

(51) Int. Cl.
- *F22B 1/02* (2006.01)
- *F22B 37/26* (2006.01)
- *G21C 1/32* (2006.01)
- *F01L 15/10* (2006.01)

(56) References Cited

FOREIGN PATENT DOCUMENTS

| | | |
|---|---|---|
| JP | H01116497 | 5/1989 |
| JP | 03255983 A * | 11/1991 |
| JP | H03255983 | 11/1991 |

\* cited by examiner

.US 10,510,453 B2

ELECTRICITY GENERATION FACILITY COMPRISING A DEVICE FOR PRODUCING STEAM OF REDUCED HEIGHT, APPLICATION TO PWR AND BWR REACTORS

CROSS-REFERENCE TO RELATED APPLICATIONS

This application is a national phase application under 35 U.S.C. § 371 of International Application No. PCT/IB2014/059000 filed 14 Feb. 2014, which claims priority to French Patent Application No. 13 51329 filed 15 Feb. 2013. The entire contents of each of the above-referenced disclosures is specifically incorporated herein by reference without disclaimer.

TECHNICAL FIELD

The present invention concerns an electrical energy generation facility comprising a saturated steam production device and a steam turbine suitable for generating electricity from the dry steam produced from the saturated steam.

More particularly, it concerns such a facility in which the heat source is a nuclear reactor.

The invention more particularly concerns a device for producing saturated steam from the heat released directly or indirectly by the reactor core.

The invention aims to reduce the height of such a saturated steam production device without introducing forced steam circulation.

The main application of the invention is a pressurized water reactor (PWR) with steam generator of the so-called II and III generation, like those already in service.

Although described with reference to the main application, the invention also applies to boiling water reactors (BWR).

The invention applies in particular to low- or medium-power reactors, modular or otherwise. In particular it applies to integrated design reactors.

PRIOR ART

There are many pressurized water reactors (PWR) already in service throughout the world, with a wide power range. For safety reasons, research into water reactors for low-power reactors or SMR (acronym for "Small Modular Reactor") leads to the search for reactor structures in which as many components as possible are integrated in the reactor vessel.

The literature describes a multitude of designs offering integrated types of reactor architecture. Integrated type reactors are generally very slender and have a vessel height which often exceeds twenty meters.

Amongst these integrated reactor architectures, we can distinguish two types: one in which the steam generator (GV) is housed in the reactor vessel, and the second in which the steam generator is arranged above the reactor vessel and thus forms a cover thereof.

In this second type of architecture, the reactor core where the heat is released is situated in the bottom part of the vessel. The heat-dissipating water generally circulates in forced convection thanks to pumps, but may also function in natural convection. The cold water enters the core through its lower inlet, passes through the core where it heats up, rises into a space in the center of the vessel, normally called the riser, up to the inlet of the steam generator which is situated above the vessel. This water is known as primary water for PWR. The water cools on passage through the steam generator and transfers its heat to the working fluid circuit, called the secondary water for PWR, then returns to the vessel in the annular space between an inner shell and the outer wall defining the enclosure of the steam generator.

Various designs of PWR reactors use this arrangement: here reference is made to the SMR reactor project in the name of Westinghouse, as described in publication [1]. Reference may also be made to the SMR reactor project in the name of the applicant as described and claimed in patent EP 1464058B1.

In both reactor projects, the steam generator is of the boiler type and is associated with a nuclear reactor.

This boiler steam generator comprises a saturated steam production device and two assemblies arranged upstream of the saturated steam production device. The global function of the two assemblies, arranged in series in the flow direction of the secondary steam, is to ensure that the steam produced by the tube bundle within which the primary water circulates is as dry as possible on leaving the generator. A first assembly, called the separator assembly, generally consists of cyclone separators and is suitable for removing the majority of the water from the steam and returning it under gravity to the bottom of the generator. The second downstream assembly allows the capture or, in other words, the collection of the few water particles which may still be carried by the steam downstream of the separator assembly.

In the Westinghouse [1] SMR project, the boiler steam generator is in two parts. The first part is arranged above the vessel and has an annular form. The primary water rises in a tube in the middle of the bundle and is distributed at the inlet of the tubes, passes vertically through the tubes and returns to the reactor vessel. The secondary water circulates outside the tubes. In this first part, the steam produced is very wet. It is sent to the second part of the steam generator to be dried before being used to actuate a turbine.

This design option was selected so that the assembly of the primary circuit, i.e. the vessel and the tube bundle forming the first part of the steam generator, is as compact as possible. The second part of the steam generator is then physically separated from the first part and contains both the cyclone separator assembly and the dryer assembly in one component situated next to the steam generator enclosure. Since the condensate can no longer return under gravity, a circulation pump is necessary. In other words, in the SMR project [1], it is necessary to provide a pump for forced circulation of the secondary water. Furthermore, the fluid leaving the first part of the steam generator towards the second part of the steam generator contains a high proportion of water in the liquid phase, which is mixed with the steam phase and can then flow, forming water slugs. To limit the mechanical forces on the pipework and the flow instabilities linked to these water slugs, it is preferable to place the second part of the steam generator above the first. Under these conditions, the vessel assembly plus the entire steam generator represents a great height.

In a loop PWR reactor or an integrated PWR reactor, such as that in the project described in patent EP 1464058B1, the two parts of the steam generator, i.e. the part dedicated to steam production and the part dedicated to drying, are situated in the same enclosure. However, this type of boiler steam generator has the major drawback of having a considerable height.

There is therefore a need to improve the compactness of a boiler type steam generator of a PWR pressurized water reactor while retaining a secondary water recirculation circuit without forced convection, i.e. without using one or more recirculation pumps.

More generally, there is a need to propose a device for production and drying of saturated steam which is compact, whether the steam is produced in a steam generator of a PWR pressurized water reactor or directly in the vessel of a BWR boiling water reactor, or from heat released by a combustion boiler which releases heat by combustion from one or more fuels such as coal, fuel oil, gas, wood, waste etc.

The object of the invention is therefore to meet these needs at least in part.

PRESENTATION OF THE INVENTION

To achieve this, the object of the invention is an electrical energy generation facility comprising:
- a steam production device suitable for producing saturated steam from a heat source and arranged in an enclosure;
- a set of one or more separators connected downstream to the steam production device and suitable for extracting the majority of the water from the steam produced by the device; the set of separators being arranged in the enclosure;
- a set of one or more dryers, connected upstream to the set of separators and suitable for collecting the water droplets in suspension in the steam coming from the set of separators, thus producing dry steam;
- a steam turbine comprising at least one expansion body for the dry steam, the steam turbine being suitable for generating electricity from the driest steam possible;
- a set of heat exchangers, suitable for functioning as steam superheaters or for reheating so-called feed water.

According to the invention, the set of dryers is arranged outside the enclosure of the steam production device with its inlet connected upstream to the set of separators, a first outlet connected downstream to the inlet of said turbine body and a second outlet connected downstream as a heat source to the set of exchangers.

According to an advantageous embodiment, the steam turbine is a double-body turbine comprising a body called a high-pressure body (HP) and a body called a low-pressure body (BP), the set of exchangers as a set of superheaters is connected to the outlet of the high-pressure body and to the inlet of the low-pressure body of the turbine and is suitable for reheating the steam leaving the high-pressure body before it enters the low-pressure body, and the first outlet of the set of dryers is connected downstream to the inlet of the high-pressure body of the high pressure turbine.

According to another advantageous embodiment, the steam turbine is a single-body turbine comprising a single expansion body, the set of exchangers as a set of reheaters is connected to the supply inlet for the feed water, produced downstream of the single-body turbine, of the steam production device and is suitable for reheating said feed water, and the first outlet of the set of dryers is connected downstream to the inlet of the single body of the turbine.

The invention applies in principle to PWR pressurized water reactors comprising a boiler type steam generator, whether the reactor is a loop or integrated type, and whatever its power.

Thus according to an advantageous embodiment, the heat source is a core of a pressurized water nuclear reactor PWR, and the steam production device is a steam generator comprising a tube bundle for exchanging heat between the primary water and the secondary water in the saturated steam state at the outlet from the bundle.

In this embodiment, the enclosure of the steam generator may advantageously constitute the cover of the vessel of the reactor.

In another advantageous embodiment, the heat source is a core of a boiling water nuclear reactor (BWR), the steam production device being integrated in the vessel of the BWR nuclear reactor.

Thanks to the invention, not only is there a reduction in the total height of a steam generator of a PWR reactor or a vessel of a BWR reactor, compared respectively with a boiler type steam generator or a BWR reactor vessel according to the prior art, but also the advantage is retained of having a natural circulation of the working fluid in the steam generator enclosure, in contrast to the PWR reactor of the prior art as described in publication [1].

In an advantageous embodiment, the set of dryers is housed in a single enclosure with a funnel-shaped lower part connected upstream to the second outlet of the set of dryers and downstream to the set of exchangers.

Preferably, each separator consists of a cyclone separator.

According to an advantageous characteristic, when the facility comprises a PWR pressurized water nuclear reactor with a power equal to 150 MWe, the total height of the vessel and the enclosure forming the cover is less than 15 m, typically equal to 13.5 m.

The invention also concerns a nuclear reactor comprising:
- a vessel;
- a reactor core housed in the vessel;
- a steam production device of the facility just described;
- an enclosure comprising a set of dryers of the facility just described.

DETAILED DESCRIPTION

Further advantages and characteristics of the invention will arise more clearly from reading the detailed description of exemplary embodiments of the invention, given for illustration and without limitation, with reference to the attached figures in which.

Throughout the present application, the terms "vertical", "lower", "upper", "bottom", "top", "below" and "above" should be understood with reference to a steam generator, a vessel of a reactor, a set of dryers according to the invention as they are in the vertical operating configuration. Thus in an operating configuration, the upper part of the reactor vessel is that situated above the core.

Similarly, throughout the present application, the terms "inlet", "outlet", "downstream" and "upstream" should be understood with reference to the direction of circulation of the saturated steam in a Rankine cycle, both in the steam production device and from this to the steam turbine.

For the sake of clarity, the same references, designating the same elements of the reactor and the nuclear installation according to the prior art and according to the invention, are used for FIGS. 2 to 7.

For the description of figures representing PWR nuclear reactors, the working fluid is designated the secondary fluid or water. The intermediate fluid is designated the primary fluid or water.

For the descriptions of figures representing BWR nuclear reactors, only the working fluid is described. There is no intermediate fluid.

It is specified that in all figures, the actual vessel part of the PWR or BWR reactor has been simplified and we distinguish only the core of the reactor and the main hydraulic routes for the primary steam in the case of a BWR reactor. Evidently, the reactor vessel also comprises the pumps, the pressurizer in the case of a BWR reactor, and other components not shown which are not relevant to the description of the invention.

Figure 3:
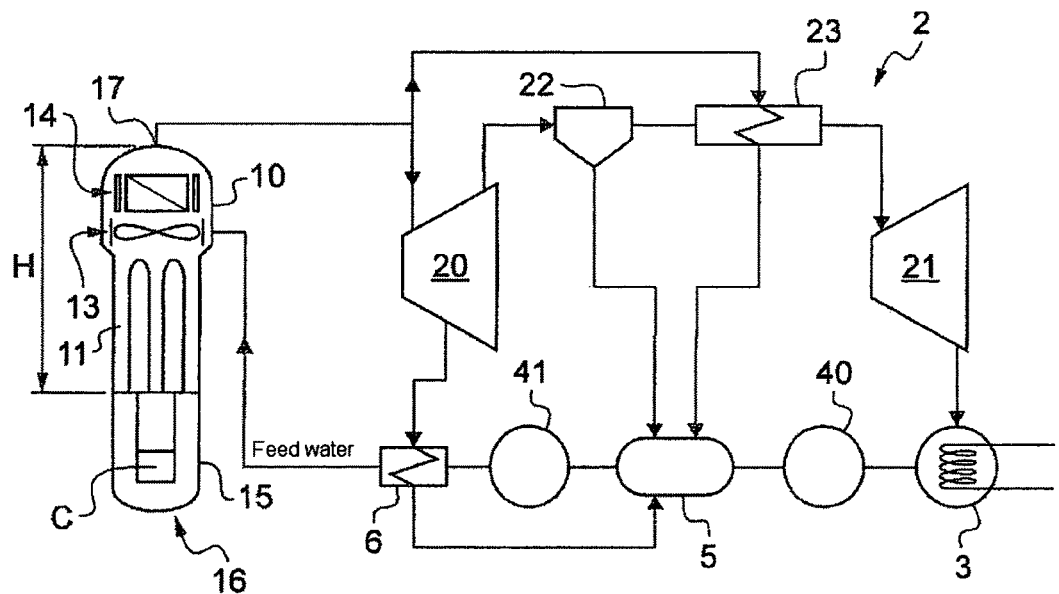
FIG. 3 is a diagrammatic view of a pressurized water nuclear reactor (PWR) according to the prior art, the secondary circuit of which uses a Rankine cycle.
Figure 4:
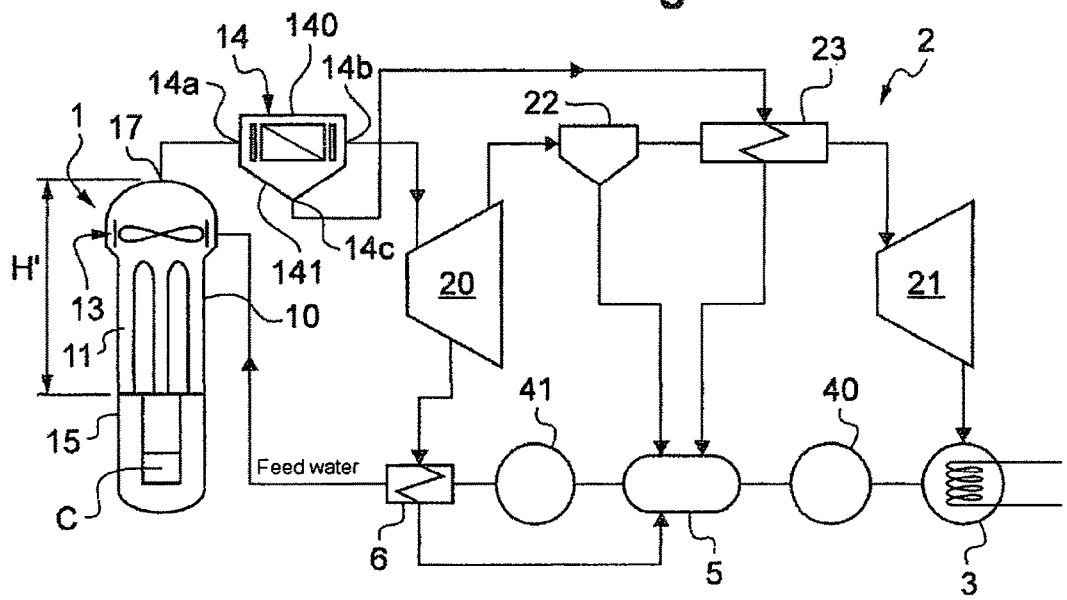
FIG. 4 is a diagrammatic view of a pressurized water nuclear reactor (PWR) according to the invention, the secondary circuit of which uses a Rankine cycle.
Figure 5:
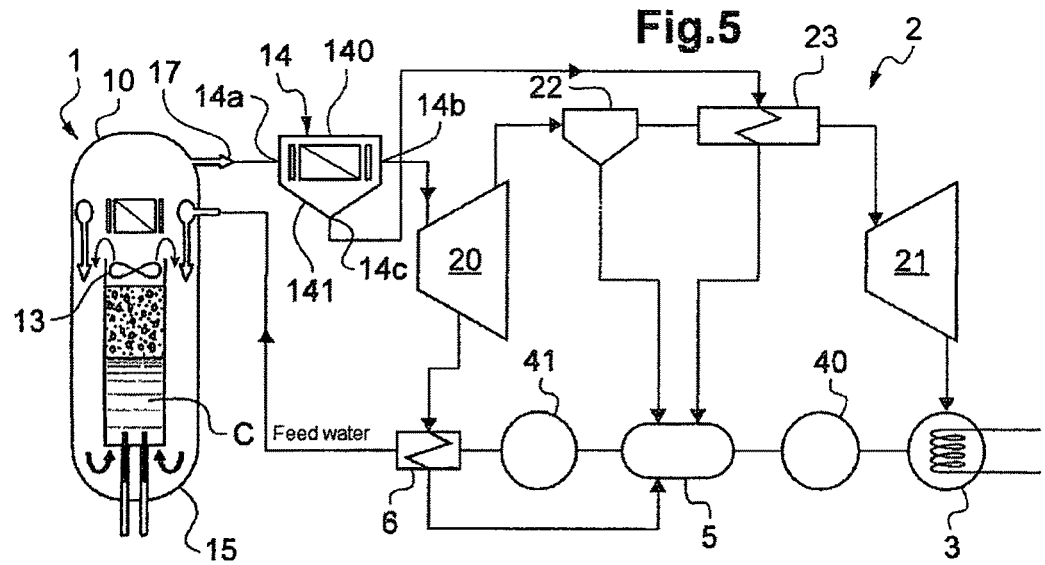
FIG. 5 is a diagrammatic view of a boiling water nuclear reactor (BWR) according to the invention, the secondary circuit of which uses a Rankine cycle.

It is also specified here that, for the sake of clarity on FIGS. 3 to 5, all extraction points on the HP high-pressure body 20 and BP low-pressure body 21 of the steam turbine 2, i.e. the parts of the secondary water (working fluid) circuit suitable for extracting secondary hot water to the feed water pipe for reheating thereof, have not been shown.

Figure 1:
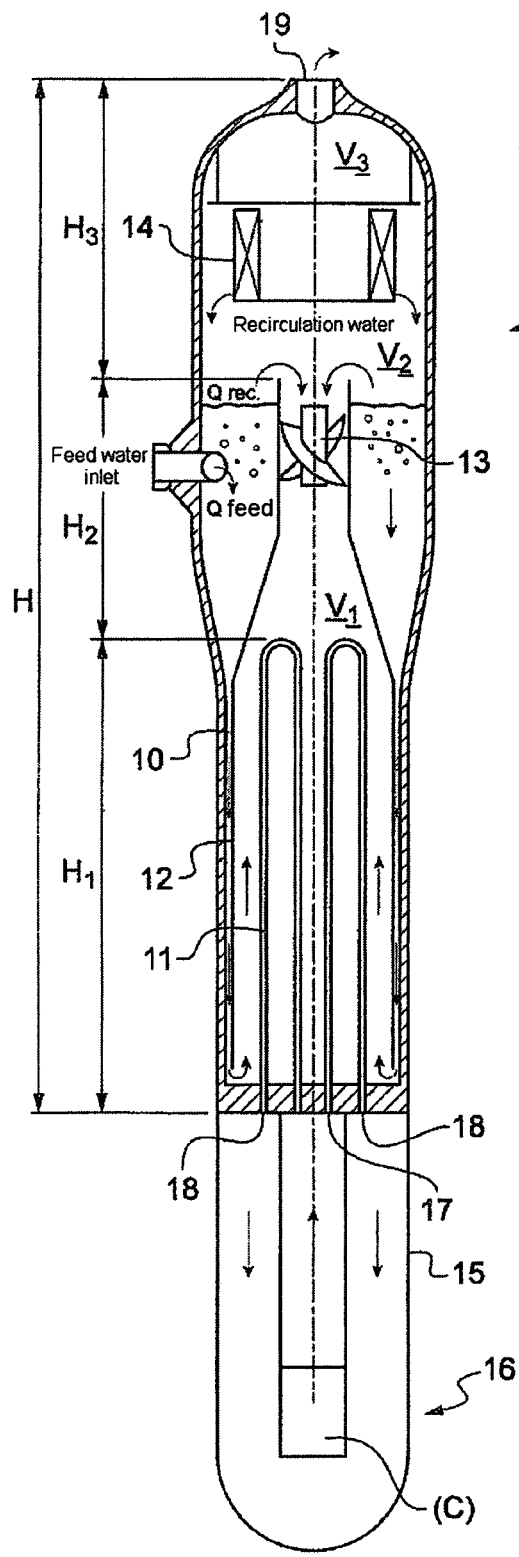
FIG. 1 is a diagrammatic view in longitudinal section of a so-called boiler steam generator for a pressurized water reactor (PWR) according to the prior art.

FIG. 1 shows in detail a so-called boiler steam generator 1 which produces steam up to saturation for PWR reactors. Such a boiler steam generator 1 is housed in an enclosure 10.

Firstly it comprises a tube bundle 11 suitable for exchanging heat between a primary fluid and the secondary fluid to be vaporized. When such a generator 1 is used to generate steam from the heat produced by a PWR-type nuclear reactor, the two fluids, i.e. primary and secondary, consist of water. The tube bundle 11 itself is housed in a shell 12 inside the enclosure 10. In general, the core C of the PWR (integrated) reactor is situated just below the enclosure 10, such that the enclosure 10 constitutes the cover of the vessel 15 of the nuclear reactor 16. It is specified that for loop-type PWR reactors, pipes for the inlet and outlet of primary water are arranged below the steam generator.

At least one impeller 13 is arranged above the tube bundle 11 and also inside the shell 12, which is fixedly mounted and forms part of a cyclone separator, the other part being the tubular envelope part consisting of the shell 12.

Above the set of cyclone separators 13 is a set of dryers 14, generally comprising chicane walls.

The function of such a steam generator 1 will now be explained in relation to the arrows indicating the water circulation direction of the primary circuit and secondary circuit.

The primary circuit consists of the so-called primary water heated by the core of the nuclear reactor, which is delivered via the inlet opening 17 and circulates in the tube bundle 11, then leaves via the outlet opening 18, in order to return to the core of the nuclear reactor.

In the first part of the steam generator 1, the water from the secondary circuit, known as secondary water, is vaporized by contact with the tube bundle 11 inside the shell 12.

At the outlet of the contact zone with the tube bundle 11, the secondary water is only partially vaporized (state V1) and cannot therefore be used as such to supply a steam turbine.

The second part of the steam generation allows complete drying of the steam before it is used to actuate the turbine. This second part comprises the set of separators 13 and the set of dryers 14. When passing through a fixed impeller 13 of a cyclone separator, the moving secondary water is set in rotation. The liquid phase is projected towards the outside while the steam phase remains in the center and passes into a state V2.

The liquid phase returns under gravity with the feed water, i.e. the secondary water which enters the steam generator 1, into the annular space delimited between the outer wall 10 and the inner shell 12.

At the outlet from the cyclone separators 13, the water in state V2 is practically entirely separated from the liquid phase but may still contain droplets of liquid water, which does not allow the secondary steam to be supplied as such to the steam turbine because of the risk of erosion which it could cause to the turbine vanes.

Thus in order to obtain dry steam at outlet 19, the secondary steam leaving the cyclone separators 13 passes at low speed through the set of dryers 14 at which the droplets are deposited and returned under gravity with the feed water, as illustrated by the curved arrows at the bottom close to the dryers 14. The steam has now reached its state V3 of dry steam.

Thus in natural convection, the secondary water passes repeatedly (three, four or more times) through a loop inside the enclosure of the steam generator, this loop being formed by the annular space between the outer wall 10 and the inner shell 12, the tube bundle 11, the cyclone separators 13 and the dryers 14.

Figure 2:
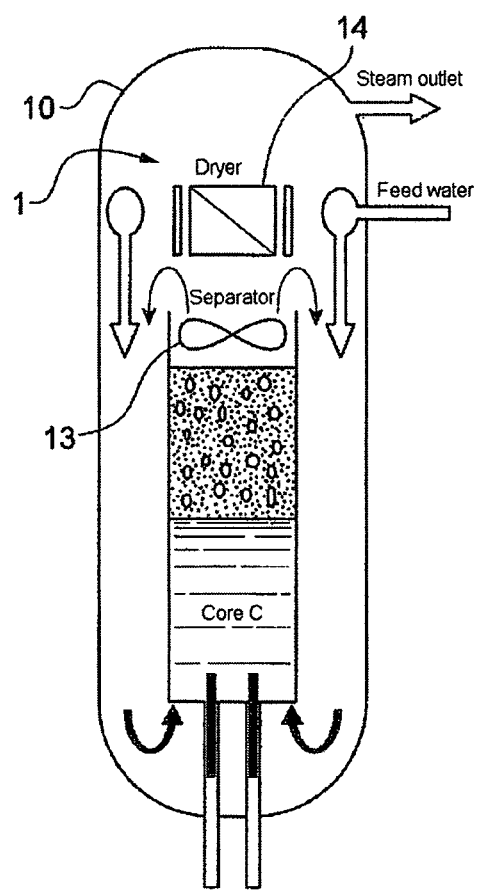
FIG. 2 is a diagrammatic view in longitudinal section of a so-called boiler steam generator for a boiling water reactor (BWR) according to the prior art.

FIG. 2 shows in detail another boiler type steam generator 1 which produces steam up to saturation for a BWR reactor. Such a boiler steam generator 1 is housed in an enclosure 10. The difference from FIG. 1 lies in the fact that there is no tube bundle 11 suitable for exchanging heat between a primary fluid and the secondary fluid to be vaporized. The working fluid is heated by passing through the core C of the nuclear reactor and is this directly transformed into steam. The set of separators 13 and the set of dryers 14 allow dry steam V3 to be obtained at the reactor outlet.

Typically, half the total height H of such a boiler steam generator 1 according to the prior art corresponds substantially to the height H1 of the tube bundle 11, a quarter of the height H corresponds substantially to the height H2 necessary for arrangement of the cyclone separators 13, and the final quarter of the height H corresponds substantially to the height H3 necessary for the arrangement of the dryers 14.

Such a boiler steam generator 1 according to the prior art is satisfactory from the point of view of its operation, but has the major drawback of taking up a large geometric space because of its substantial total height H.

This substantial height H of the steam generator 1 may be disadvantageous in reactors which are desirably as compact as possible, in particular those which have already been designed with a boiler-type steam generator as the cover of the vessel of the pressurized water reactor (PWR), as described in patent EP1464058B1.

In fact this substantial height H may be disadvantageous for a stationary, land-based nuclear facility for which a minimum height is desired, or for a nuclear facility which is able to be transported by ship.

Thus in order to reduce the total height H of such a steam generator 1, the inventor of the present invention considered physically separating the essential components of the working fluid circuit into two separate parts while retaining the natural circulation between the steam heating elements and the working fluid.

According to the invention, as illustrated in FIGS. 4 and 5, it is proposed to arrange the set of dryers 14 outside the enclosure 10 of the steam generator 1, with its inlet 14a connected upstream to the set of separators 13, a first outlet 14b connected downstream to the inlet of the high-pressure body 20 of a steam turbine 2, and a second outlet 14c connected downstream to the set of superheaters 23.

In other words, the set of cyclone separators 13 remains above the tube bundle 11 inside the enclosure 10 of the steam generator 1 as in the prior art, but in accordance with the invention the set of dryers 14 is placed outside the enclosure 10 of the generator 1. Since the liquid phase of the secondary water collected by the set of dryers 14 can no longer return under gravity towards the feed water as in the prior art, according to the invention it is sent directly to the set of superheaters 23 of the turbine.

In yet other words, thanks to the invention, not only is the total height of the steam generator according to the invention reduced compared with a boiler-type steam generator according to the prior art, but also the advantage is retained of having a natural circulation of the working fluid inside the enclosure 10 of the generator 1, in contrast to the PWR reactor of the prior art as described in publication [1].

FIG. 3 shows a simplified diagram of a Rankine cycle as normally found in a secondary circuit of a PWR reactor according to the prior art, in which a steam generator 1 as described in FIG. 1 is contained inside an enclosure 10, the secondary water circuit comprising a steam turbine 2 with two expansion bodies 20, 21.

From upstream to downstream of the steam generator 1, the secondary circuit comprises the steam turbine 2 which itself comprises an HP high-pressure body 20 and a low-pressure body 21. A set of dryers 22 in series with a set of superheaters 23 is connected firstly to the outlet of the HP body 20 and secondly to the inlet of the BP body 21. The set of superheaters 23 is preferably situated at the outlet from the set of dryers 22.

The sets of dryers 22 and superheaters 23 have the function of improving the efficiency of the steam turbine 2 and preventing erosion of the vanes of the BP body 21. In fact at the outlet from the HP body 20, the secondary steam is very wet with a thermodynamic titer of the order of 10%. Thus the set of dryers 22 allows the thermodynamic titer to be returned to a value equal to the unit to prevent erosion of the vanes of the BP body 21 of the turbine 2. The set of superheaters 23 allows reheating of the secondary steam leaving the HP body 20 before it enters the BP body 21, which improves the efficiency of the turbine. Typically, in a secondary circuit of a PWR reactor, the steam pressure at the outlet from the HP body 20 is of the order of around ten bar.

The steam is superheated by extraction thereof just at the inlet to the HP body 20 by the secondary circuit part which conducts it directly to the set of superheaters 23. Typically, before entering the HP body, around 10% of the steam is diverted for steam superheating.

This steam, which leaves the steam generator and bypasses the HP body 20, then transfers its heat by condensation to the main part of the secondary circuit which connects the dryers 22 to the BP body 21.

In the return part of the secondary circuit, i.e. that which returns the feed water to the inlet of the steam generator 1, at the outlet of the BP 21 of the turbine 2, the steam is then completely condensed by means of a condenser 3 which is of the very low pressure type, then returned by means of a first pump called a lift pump 40 to a water collector 5, normally called the feed tank. A second pump 41, called the feed water pump, allows the supply of the steam generator 1 with high-pressure feed water. Part of the steam leaving the HP body 20 of the turbine 2 allows the preheating of the feed water by means of a set of reheaters 6 downstream of the feed pump 41. The steam used to preheat the feed water via the reheaters 6 may return upstream to the feed tank 5. The steam which serves to reheat the feed water by extraction of steam between two expansion stages in the HP body 20 may also return to the feed tank 5. The same applies to the condensate from the dryer 22.

FIG. 4 shows the same simplified diagram of the Rankine cycle of a PWR reactor according to FIG. 1, but with an arrangement of the set of dryers 14 according to the invention.

Here the set of dryers 14 is placed outside the enclosure 10 of the generator 1, with its inlet 14a connected upstream to the set of separators 13, a first outlet 14b connected downstream to the inlet of the high-pressure body 20 of the turbine 2, and a second outlet 14c connected downstream to the set of superheaters 23.

The set of dryers 14 is housed in an enclosure 140 in the form of a funnel 141, the opening 14c of which is connected upstream to the second outlet of the set of dryers 14 and downstream to the set of superheaters 23.

Thus according to the invention, the circulation of working fluid in the steam generator 1 is ensured naturally by natural convection inside the enclosure 10, i.e. without forced convection, in a hydraulic loop comprising the annular space, the tube bundle 11 and the cyclone separators 13. In fact the condensate collected by the set of dryers 14, with the steam flow necessary for superheating, is sent via the funnel 141 to the set of superheaters 23 between the HP body 20 and the BP body 21 of the turbine 2. As illustrated, all other parts of the secondary circuit of FIG. 4 according to the invention remain unchanged in relation to those of the secondary circuit of FIG. 3 according to the prior art.

The steam leaving the enclosure 10 of the steam generator is of poor quality and cannot be introduced in the turbine 2 since it contains water droplets, but the quantity of liquid water is low and the flow of this mixture does not risk causing the slug-type flow harmful to stability. Under these conditions, the enclosure 140 containing the dryers 14 may be placed next to the enclosure 10 of steam generator 1 with no height constraint. A suitable position is to place this enclosure 140 slightly below the upper part of the enclosure 10 of the steam generator 1 with the aim of reducing the total height of the reactor, i.e. of the vessel and the assembly of the steam production device comprising the steam generator enclosure 10 and the drying enclosure 140.

FIG. 5 shows the same simplified diagram of the Rankine cycle of a BWR reactor according to FIG. 2, but with an arrangement of the set of dryers 14 according to the invention as shown and described for FIG. 4.

Thanks to the invention, for a PWR reactor with a power of 150 MWe, in combination with an increase in the exchange length of the tube bundle 11 and by relocating the dryer part according to the present invention, a total height H' of the steam generator enclosure 10 of around 5 m can be achieved. Without relocating the part of the dryers 14 according to the invention, the total height H of the steam generator enclosure 10 according to the prior art would be around one meter more.

Other applications than that just described with reference to a PWR reactor may be considered within the context of the invention.

Thus as described with reference to FIGS. 2 and 5, it is quite possible to relocate the set of dryers 14 outside the reactor vessel of a boiling water type reactor already known, such as an ESBWR reactor ("Economic Simplified Boiling Water Reactor") in which until now a set of separators and a set of dryers have necessarily been integrated in the upper part of the reactor vessel (FIG. 2).

The invention could also be applied to an electrical energy generation facility with a nuclear reactor and a single-body turbine 2, i.e. a turbine which comprises a single steam expansion body 20. Such an application is illustrated with reference to FIG. 6 according to the prior art and FIG. 7 according to the invention.

Figure 6:
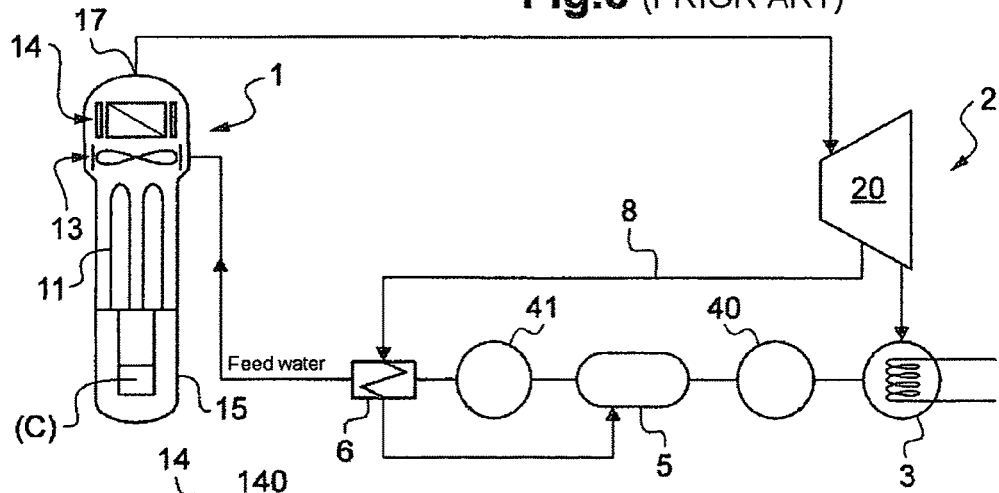
FIG. 6 is a diagrammatic view of a pressurized water nuclear reactor (PWR) according to the prior art, the secondary circuit of which uses a Rankine cycle with a single-body turbine.

FIG. 6 shows a simplified diagram of the Rankine cycle normally found in a secondary circuit of a PWR reactor according to the prior art, in which a steam generator 1 as described in FIG. 1 is contained inside an enclosure 10, but in contrast to FIGS. 3 and 4, the secondary circuit comprises a single-body steam turbine 2 with a single expansion body 20.

In contrast to a secondary circuit with a double-body turbine illustrated in FIG. 3 according to the prior art and FIG. 5 according to the invention, the single-body steam turbine 2 does not comprise the set of dryers 22 and the set of superheaters 23.

Thus in the return part of the secondary circuit with a single-body turbine 2, i.e. that which returns the feed water to the inlet of the steam generator 1:

a part of the steam leaving the single body 20 of the turbine 2 is fully condensed by means of the condenser 3;

another part of the steam leaving the single body 20 of the turbine 2 allows preheating of the feed water by means of the set of reheaters 6 downstream of the feed water pump 41. The steam used for preheating of the feed water by the reheaters 6 may return upstream to the feed tank 5.

Figure 7:
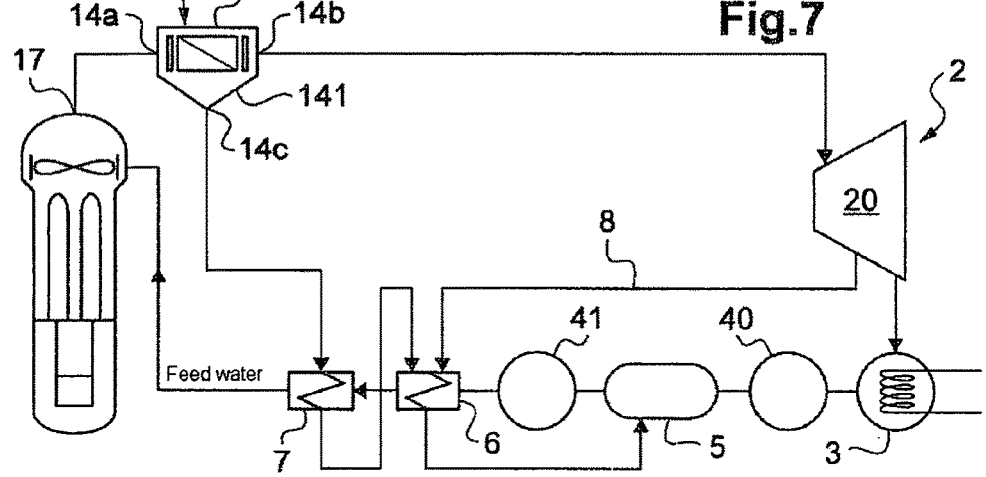
FIG. 7 is a diagrammatic view of a pressurized water nuclear reactor (PWR) according to the prior art, the secondary circuit of which uses a Rankine cycle with a single-body turbine.

As illustrated in FIG. 7 according to the invention, in a secondary circuit with a single-body turbine 2, it is proposed, at the outlet 14c of the set of dryers 14, to send the condensate to a set of reheaters 7 for reheating the feed water already preheated in advance by the other set of reheaters 6.

At the outlet from the reheaters 7, the condensate may be sent to the reheaters 6 for preheating the feed water. Similarly, the steam 8 extracted from the body 20 may be sent to the reheater 6 for the same purpose.

It is also possible to apply the installation to an electrical energy generation facility in which steam is produced not with a nuclear reactor but with a boiler releasing heat by combustion of one or more fuels, such as coal, fuel oil, gas, wood or waste.

The invention is not limited to the examples which have just been described; in particular the characteristics of the examples illustrated may be combined within variants not illustrated.

REFERENCE CITED

[1]: *"Westinghouse Small Modular Reactor Nuclear Steam Supply System Design"*—Proceedings of ICAPP '12 Chicago, USA, Jun. 24-28, 2012—Paper 12248

The invention claimed is:

1. An electrical energy generation facility comprising:
a steam production device configured to produce steam saturated with water in the form of water droplets in suspension from a heat source and feed water and arranged in an enclosure forming a pressure vessel;

a set of one or more separators connected downstream to the steam production device and configured to extract a majority of the water from the steam produced by the device; the set of separators being arranged in the enclosure;

a set of one or more dryers having an inlet, connected upstream to the set of separators configured to collect the water droplets coming from the set of separators, thus producing dry steam;

a steam turbine comprising at least one expansion body for the dry steam, the steam turbine being configured to generate electricity from the dry steam;

a set of one or more exchangers, configured to function as steam superheaters or to reheat the feed water;

wherein the set of dryers is arranged outside the enclosure of the steam production device with the inlet connected upstream to the set of separators, a first outlet connected downstream to an inlet of said turbine body, and a second outlet connected downstream as a heat source to the set of exchangers.

2. The electrical energy generation facility as claimed in claim 1, wherein the steam turbine is a double-body turbine comprising a high-pressure body and a low-pressure body, wherein the set of exchangers is connected to the outlet of the high-pressure body and to the inlet of the low-pressure body of the turbine and is configured to reheat the steam leaving the high-pressure body before it enters the low-pressure body, and wherein the first outlet of the set of dryers is connected downstream to the inlet of the high-pressure body of the high-pressure turbine.

3. The electrical energy generation facility as claimed in claim 1, wherein the steam turbine is a single-body turbine comprising a single expansion body, wherein the set of exchangers as a set of reheaters is connected to the supply inlet for the feed water, produced downstream of the single-body turbine, of the steam production device and is suitable for reheating said feed water, and wherein the first outlet of the set of dryers is connected downstream to the inlet of the single body of the turbine.

4. The electrical energy generation facility as claimed in claim 1, wherein the electrical generation facility comprises a PWR pressurized water nuclear reactor and the heat source is a core of the PWR pressurized water nuclear reactor, said PWR pressurized water nuclear reactor having a vessel, and wherein the steam production device is a steam generator having an enclosure and comprising a tube bundle for exchanging heat between primary water and secondary water in a saturated steam state at the outlet from the bundle.

5. The electrical energy generation facility as claimed in claim 4, wherein the enclosure of the steam generator constitutes vessel of the PWR pressurized water nuclear reactor.

6. The electrical energy generation facility as claimed in claim 1, wherein the heat source is a core of a boiling water nuclear reactor (BWR), the steam production device being integrated in the vessel of the BWR nuclear reactor.

7. The electrical energy generation facility as claimed in claim 1, wherein the set of dryers is housed in a single enclosure with a funnel-shaped lower part connected upstream to the second outlet of the set of dryers and downstream to the set of exchangers.

8. The electrical energy generation facility as claimed in claim 1, wherein each separator consists of a cyclone separator.

9. The electrical energy generation facility as claimed in claim 5, wherein the PWR pressurized water nuclear reactor has a power equal to 150 MWe, and the total height of the enclosure is less than 15 m.

10. An electrical energy generation facility comprising:
a steam production device configured to produce steam saturated with water in the form of water droplets in suspension from a heat source and feed water and arranged in an enclosure;
a set of one or more separators connected downstream to the steam production device and configured to extract a majority of the water from the steam produced by the device; the set of separators being arranged in the enclosure;
a set of one or more dryers having an inlet, connected upstream to the set of separators configured to collect the water droplets coming from the set of separators, thus producing dry steam;
a steam turbine comprising at least one expansion body for the dry steam, the steam turbine being configured to generate electricity from the dry steam;
a set of one or more exchangers, configured to function as steam superheaters or to reheat the feed water;
wherein the set of dryers is arranged outside the enclosure of the steam production device with the inlet connected upstream to the set of separators, a first outlet connected downstream to an inlet of said turbine body, and a second outlet connected downstream as a heat source to the set of exchangers, and
wherein the steam turbine is a double-body turbine comprising a high-pressure body and a low-pressure body, wherein the set of exchangers is connected to the outlet of the high-pressure body and to the inlet of the low-pressure body of the turbine and is configured to reheat the steam leaving the high-pressure body before it enters the low-pressure body, and wherein the first outlet of the set of dryers is connected downstream to the inlet of the high-pressure body of the high-pressure turbine.

11. The electrical energy generation facility as claimed in claim 10, wherein the electrical generation facility comprises a PWR pressurized water nuclear reactor and the heat source is a core of the PWR pressurized water nuclear reactor, said PWR pressurized water nuclear reactor having a vessel, and wherein the steam production device is a steam generator having an enclosure and comprising a tube bundle for exchanging heat between primary water and secondary water in a saturated steam state at the outlet from the bundle.

12. The electrical energy generation facility as claimed in claim 11, wherein the enclosure of the steam generator constitutes a cover of the vessel of the PWR pressurized water nuclear reactor.

13. The electrical energy generation facility as claimed in claim 12, wherein the PWR pressurized water nuclear reactor has a power equal to 150 MWe, and the total height of the vessel and the enclosure forming the cover is less than 15 m.

14. The electrical energy generation facility as claimed in claim 10, wherein the heat source is a core of a boiling water nuclear reactor (BWR), the steam production device being integrated in the vessel of the BWR nuclear reactor.

15. The electrical energy generation facility as claimed in claim 10, wherein the set of dryers is housed in a single enclosure with a funnel-shaped lower part connected upstream to the second outlet of the set of dryers and downstream to the set of exchangers.

16. The electrical energy generation facility as claimed in claim 10, wherein each separator consists of a cyclone separator.

* * * * *